(12) United States Patent
Wendeberg et al.

(10) Patent No.: US 6,889,812 B2
(45) Date of Patent: May 10, 2005

(54) MOTOR VEHICLE COMPRISING TILTABLE GEAR SHIFT UNIT AND METHOD OF ACTIVATING A PARKING BRAKE FORMING PART OF THE VEHICLE

(75) Inventors: Staffan Wendeberg, Torslanda (SE); Robert Broström, Göteborg (SE); Henrik Boström, Mora (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/707,336

(22) Filed: Dec. 5, 2003

(65) Prior Publication Data

US 2004/0159487 A1 Aug. 19, 2004

Related U.S. Application Data

(63) Continuation of application No. PCT/SE02/01077, filed on Jun. 4, 2002, now abandoned.

(30) Foreign Application Priority Data

Jun. 5, 2001 (SE) .............................................. 0101951

(51) Int. Cl.$^7$ .............................................. B60K 41/26
(52) U.S. Cl. .................................................. 192/219.4
(58) Field of Search .............................. 192/219, 219.4, 192/219.5, 219.6; 74/473.1, 473.19, 473.33

(56) References Cited

U.S. PATENT DOCUMENTS

| 3,635,317 | A | * | 1/1972 | Crabb et al. | ............. 192/220.1 |
| 3,854,559 | A | * | 12/1974 | Talak et al. | ............. 192/220.1 |
| 4,732,232 | A | | 3/1988 | Miyagi et al. | ............. 180/336 |
| 4,823,635 | A | | 4/1989 | Selby | ............. 74/524 |
| 4,875,563 | A | * | 10/1989 | Larson et al. | ............. 192/219.4 |
| 6,029,535 | A | | 2/2000 | Kenny et al. | ............. 74/473.3 |

FOREIGN PATENT DOCUMENTS

| FR | 2752779 A1 | 3/1998 |
| WO | WO 0058646 A1 | 10/2000 |

* cited by examiner

Primary Examiner—Saul Rodriguez
(74) Attorney, Agent, or Firm—Novak Druce & Quigg LLP

(57) ABSTRACT

A vehicle including a gearshift unit having a gearshift lever housing (4) and a gearshift lever (5) moveable in relation to the gearshift lever housing (4), the gearshift lever being maneuverable within an active position range for active gearshift positions and a neutral position in which the gearshift lever is tiltable, between the active position range and a tilted position, in which latter position the gearshift lever (5) is aligned in or below the seat plane of the driver's seat (2), and a logic unit (34) with is designed to control the activation of a parking brake forming part of the vehicle.

15 Claims, 2 Drawing Sheets

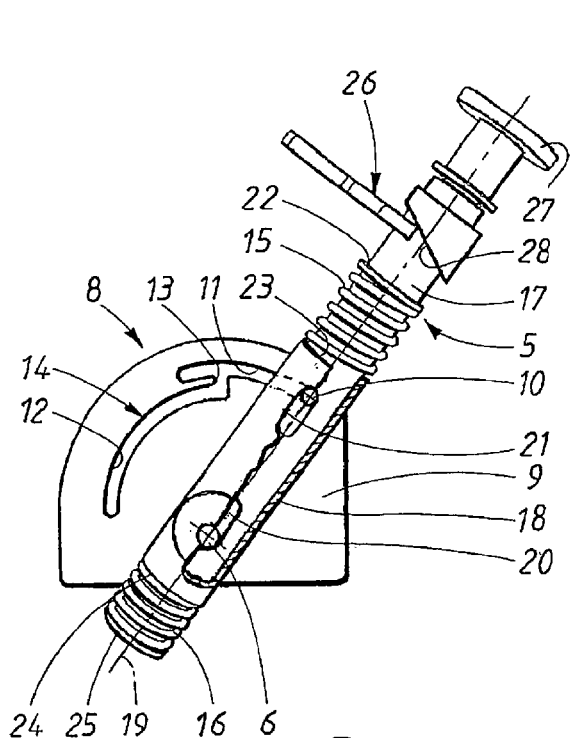
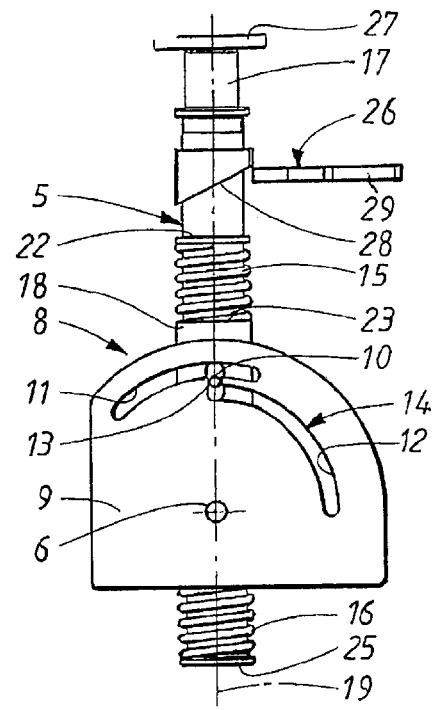
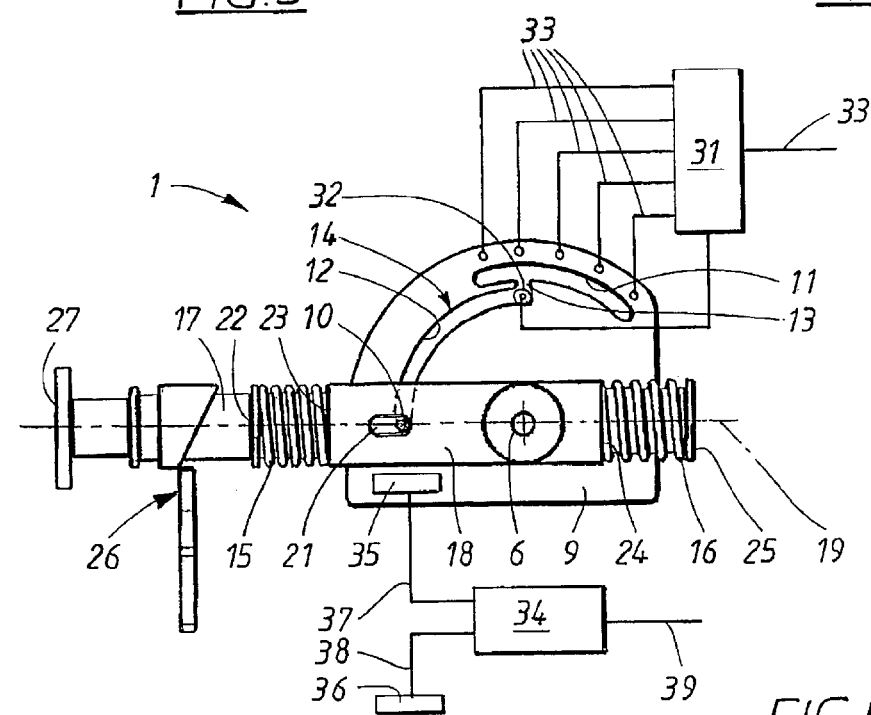
FIG.3
FIG.4
FIG.5

MOTOR VEHICLE COMPRISING TILTABLE GEAR SHIFT UNIT AND METHOD OF ACTIVATING A PARKING BRAKE FORMING PART OF THE VEHICLE

CROSS REFERENCE TO RELATED APPLICATIONS

HTML1DocumentEncodingutf-8The present application is a continuation patent application of International Application No. PCT/SE02/01077 filed 4 Jun. 2002 which was published in English pursuant to Article 21(2) of the Patent Cooperation Treaty, and which claims priority to Swedish Application No. 0101951-2 filed 5 Jun. 2001. Both applications are expressly incorporated herein by reference in their entireties.

BACKGROUND OF INVENTION

1. Technical Field

The present invention relates to a gearshift unit of a so-called shift-by-wire type for motor vehicle. The gearshift unit, according to the invention, is primarily intended for use in a driver's cab of a truck, but can be advantageously used in other types of vehicle such as conventional passenger cars, so-called minivans, multi-purpose vehicles (MPVs) and sport-utility vehicles (SUVs).

2. Background Art

A conventional non-tiltable gearshift unit often encroaches on the cab space and gets in the way when the driver wants to move from the driver's seat to the cab sleeping compartment which is normally located behind the drivers" seat. More generally, conventional gearshift units tend to make getting into and out of the driver's seat more difficult in all types of vehicle.

One solution to this problem that has long been known is to design the gearshift unit so that it can be tilted out of the way, thereby making it easier to get into and out of the driver's seat. Examples of such tiltable gearshift levers are described, for example, in Swedish Patent No. 511,030, U.S. Pat. Nos. 4,823,635 and 6,029,535, as well as the French Patent No. FR-2 752 779.

The aforementioned documents, however, all describe gearshift levers that are directly and mechanically coupled to the gearbox of the vehicle. However, more and more vehicles are nowadays being equipped with gearshift units of the so-called "shift-by-wire" type in which various positions of the gearshift lever are communicated to the gearbox by electronic signals without the existence of any mechanical clutch. Locating the gearshift unit in direct proximity to the driver's seat was also previously known in the case of gearshift units of the "shift-by-wire" type, it being possible to fold the entire gearshift unit down sideways, or to shift it rearwards in order to facilitate access to the sleeping compartment of the cab. An example of a gearshift unit of the "shift-by-wire" type in which the gearshift lever can be tilted in such a manner is given in the German Patent No. DE 19913835.

One problem with the aforementioned known tiltable gearshift levers and gearshift units is that of ensuring that the vehicle parking brake is applied when the gearshift lever or the gearshift unit is in the tilted position. This means that there is a risk of the vehicle accidentally starting to move uncontrolledly.

SUMMARY OF INVENTION

An object of the present invention is to provide a vehicle in which the aforementioned problems associated with gearshift units of the "shift-by-wire" type are avoided. This object is achieved by providing a vehicle comprising (including, but not limited to) a gearshift unit having a gearshift lever housing and a gearshift lever moveable in relation to the housing. The gearshift lever is maneuverable within an active position range for active gearshift positions, and a neutral position in which the gearshift lever is tiltable, between the active position range and a tilted position, in which latter position the gearshift lever is aligned in or below the seat plane of the driver's seat. A logic unit is provided that is designed to control the activation of a parking brake forming part of the vehicle. The logic unit is designed to form part of the vehicle and to activate the vehicle parking brake, provided that both of the following conditions are fulfilled: (a) the logic unit receives a first signal indicating that the gearshift lever is in its tilted position; and (b) the logic unit receives a second signal indicating that the vehicle is stationary. In this manner, it is insured that the parking brake is correctly activated, thereby reducing the risk of the vehicle starting to uncontrollably roll.

In a preferred embodiment of the invention, the gearshift unit is firmly fixed to a sprung part of the driver's seat. Further in the preferred embodiment, the gearshift lever is provided with a pivot pin arranged at a distance from the main pivot axis, the pivot pin, through manipulation of the gearshift lever, being designed to run either in a first, active slot in order to assume active gearshift positions or in a second tilting slot for assuming a tilted position.

The active slot is furthermore connected to the tilting slot solely by way of an intermediate neutral position slot; the position which corresponds to the gearshift neutral position.

In an advantageous embodiment, the pivot pin is designed, by means of spring-loading, to be retained in the neutral position slot when the neutral position has been assumed either from the active slot or from the tilting slot.

The spring-loading is suitably achieved by two spring elements arranged in opposition to one another. The pivot pin is preferably axially displaceable along an axis of symmetry of the gearshift lever.

In a suitable embodiment, the active slot and the tilting slot run essentially radially around the main pivot axis of the gearshift lever.

The gearshift is preferably provided with operating elements for axial displacement of the pivot pin along the axis of symmetry of the gearshift lever, the operating elements being designed to act upon the pivot pin with a force exceeding the spring force from the spring-loading.

The operating elements suitably comprise a first element for introducing the pivot pin into the active slot so that the gearshift lever can be moved between the active gearshift positions. A second element is provided for introducing the pivot pin into the tilting slot thereby allowing the gearshift lever to be tilted.

The first element preferably comprises a ramp sloping at an inclined angle towards the axis of symmetry of the gearshift lever. The ramp is rigidly connected to the pivot pin. A button element interacts with the ramp and is arranged so that it is displaceable essentially at right angles to the axis of symmetry. The ramp, and hence the pivot pin, are displaced along the axis of symmetry of the gearshift lever when a driver presses the button element against the ramp.

In the preferred embodiment of the invention, a sensor is designed exclusively to detect when the pivot pin is situated in the active slot so that position signals cannot be emitted when the pivot pin is in the tilting slot.

The invention also comprises a method in tiltable gearshift units, the method being characterized in particular in that a logic unit situated in the vehicle activates the vehicle parking brake, provided that both of the following conditions are fulfilled: (a) that the logic unit receives a first signal indicating that the gearshift lever is in its tilted position; and (b) that the logic unit receives a second signal indicating that the vehicle is stationary.

BRIEF DESCRIPTION OF DRAWINGS

The invention will be described below through exemplary embodiments, with reference to drawings attached, in which:

FIG. 3 shows a greatly simplified, and partially cut-away view of a gearshift mechanism configured according to a preferred embodiment of the invention and in which the gearshift lever is in an active gearshift position;

FIG. 4 shows the gearshift mechanism of FIG. 3, viewed from the opposite side and with the gearshift lever in a; neutral position; and FIG. 5 shows the gearshift mechanism of FIGS. 3 and 4, but with the gearshift lever in its tilted position and, in diagrammatic form, sensors for delivering gear position signals to the gearbox and for activating the parking brake.

DETAILED DESCRIPTION

Figure 1:
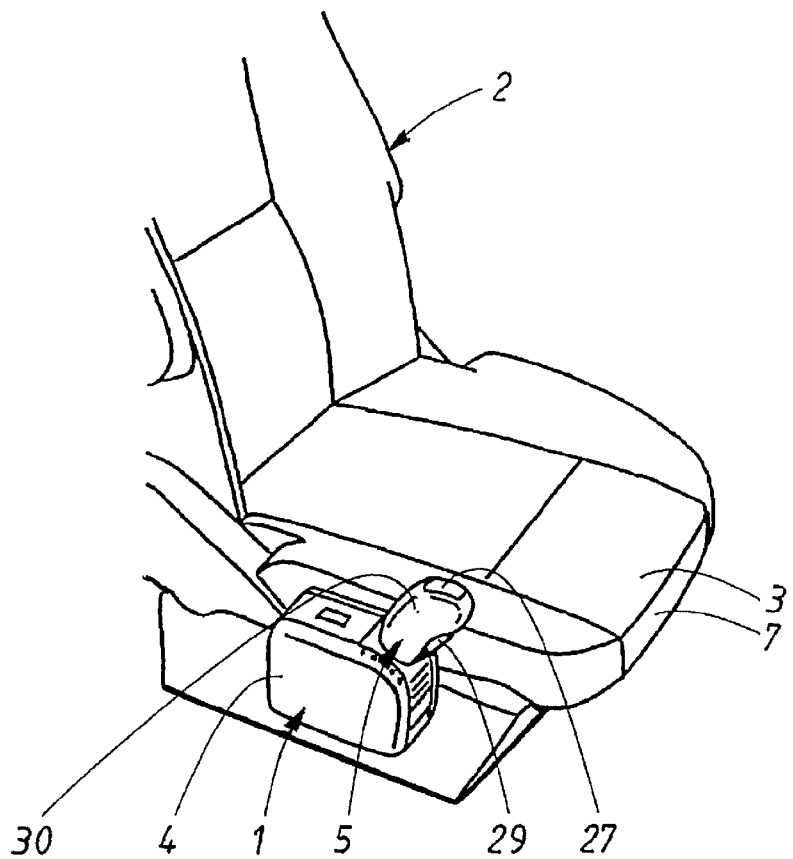
FIG. 1 shows a broken, partial view of a driver's seat provided with a tiltable gearshift lever configured according to a preferred embodiment of the invention, the gearshift lever oriented in an active gearshift position.

FIG. 1 shows a preferred embodiment of the invention in which the gearshift lever is tiltable. In an alternative embodiment of the invention (not shown), the entire gearshift unit is tiltable. The reference number 1 generally denotes a gearshift unit for a motor vehicle (not shown). In the preferred embodiment of the invention, the gearshift unit 1 is firmly fixed to a sprung part of a driver's seat 2. The sprung part here consists of the seat part 3 of the driver's seat 2. In alternative embodiments of the invention (not shown), the gearshift unit 1 may instead be mounted directly on an unsprung driver's seat 1 of the general type used, for example, in passenger cars, or elsewhere in the cab or interior space; for example, directly adjoining a center console situated between driver's seat and front passenger seat.

The gearshift unit 1 essentially comprises a gearshift lever housing 4 and a gearshift lever 5. The gearshift lever 5 is supported about a main pivot axis 6 in the gearshift lever housing 4. The main pivot axis 6 is not shown in FIGS. 1 5, but is shown in FIGS. 6–8, with reference to which a preferred embodiment of the gearshift unit 1 will be discussed in greater detail below. The main pivot axis 6 is essentially aligned in the transverse direction of the vehicle, the gearshift lever 5 being moved forwards or backwards when assuming the various gearshift positions.

Figure 2:
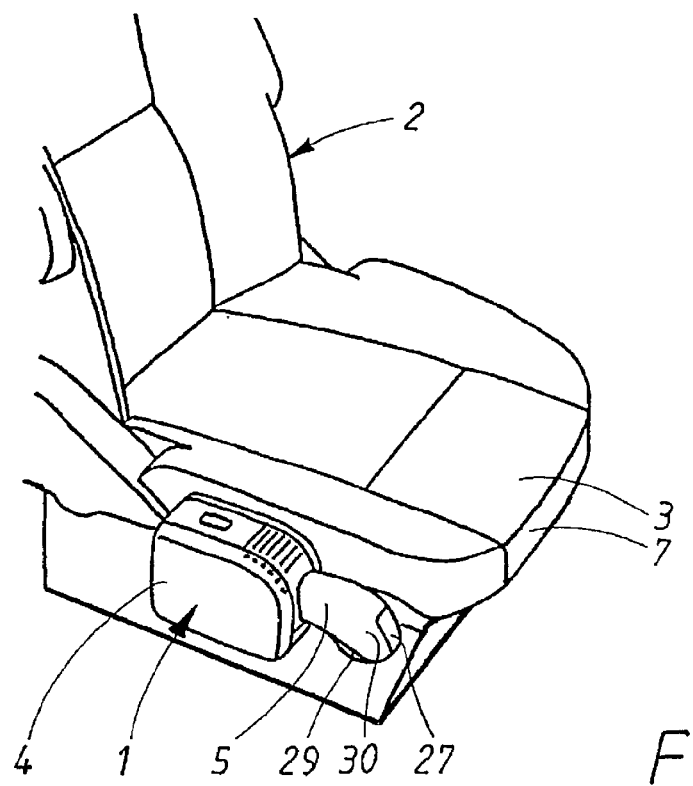
FIG. 2 shows the gearshift unit of FIG. 1, but with the gearshift lever in its tilted position.

The gearshift lever 5 is furthermore arranged so that it can be tilted about the main pivot axis 6 between an active position range for active gearshift positions and a tilted position in which the gearshift lever 5 is aligned horizontally in or below the seat plane of the driver seat 2. In the illustration, the seat plane is represented by the seat part 3 of the driver's seat 2. In FIG. 1, the gearshift lever 5 is shown in a gearshift position in which the gearshift lever 5 is projecting relatively upright from the gearshift lever housing 4. FIG. 2 then shows the gearshift lever 5 in its tilted position. In this position, the gearshift lever is tilted forwards in the direction of the vehicle. The length of the gearshift lever 5 is adjusted in such a way that the gearshift lever 5 does not project beyond the leading edge 7 of the seat 2.

The function of a gearshift mechanism 8 configured according to the invention will be described in more detail below with reference to FIGS. 3, 4 and 5. The gearshift mechanism 8 is simplified for the sake of clarity. The gearshift mechanism 8 comprises a rod 17, which is pivoted about the main pivot axis 6. The main pivot axis 6 is fixed to a frame 9 firmly connected to the gearshift lever housing 4. The rod 17 is furthermore provided with a pivot pin 10 arranged at a distance from the main pivot axis 6. The pivot pin 10 is designed, through manipulation of the rod, to run either in a first, active slot 11 for active gearshift positions or in a second tilting slot 12 for assuming an inactive and tilted position. The active slot 11 is connected to the tilting slot 12 solely by an intermediate neutral position slot 13, the position of which corresponds to the neutral position of the gearshift lever 5. Here, all slots 11, 12, 13 are designed as a connected shifting gate 14 recessed in the frame 9. By means of this design, the gearshift lever 5 can only be tilted into its tilted position from the neutral position, and when the gearshift lever 5 is again to be turned up into the active position it can only be turned up into the neutral position.

In FIG. 3, the gearshift lever 5 is shown in an active gearshift position, the pivot pin 10 being situated in the active slot 11 of the shifting gate 14.

The rod 17 is designed, through spring-loading from two centering coil springs 15 and 16 acting in opposition to one another, so that the pivot pin 10 is retained in the neutral position slot 13 when the neutral position is assumed either from the active slot 11 or from the tilting slot 12. The neutral position is shown in FIG. 4, in which the rod 17 is locked in the neutral position slot 13 by virtue of the fact that the pivot pin is located between the essentially radially directed surfaces of the intermediate neutral position slot by the two coil springs 15 and 16. The spring-loading may alternatively be provided by spring elements other than the coil springs 15 and 16 shown in the figures, provided that they create a similarly centering action.

In the gearshift unit 8, a cylindrical sleeve 18 is firmly supported around the main pivot axis 6. A central rod 17 is arranged, axially displaceable, in the sleeve. The rod 17 is axially displaceable along an axis of symmetry 19 of the sleeve 18. Since the pivot pin 10 is firmly fixed in the rod 17 and projects therefrom essentially at right angles to the axis of symmetry 19, the pivot pin 10 is therefore also axially displaceable along the axis of symmetry 19. In order to permit this facility for axial displacement on the part of the pivot pin 10, the cylindrical sleeve 18 is provided with an elongated slot 21, which likewise extends in the direction of the axis of symmetry 19. The upper coil spring 15 in relation to the sleeve 18 bears upwardly against an upper step washer 22 and downwardly against the upper end surface 23 of the sleeve 18. The lower coil spring 16 in relation to the sleeve 18 correspondingly bears upwardly against the lower end surface 24 of the sleeve 18 and downwardly against a lower step washer 25. The upper and lower step washers 22, 25, respectively, are firmly fixed to the rod 17.

As can clearly be seen from FIG. 4, the active slot 11 and the tilting slot 12 run essentially along a radius around the main pivot point 6 of the gearshift lever 5. In the preferred embodiment as shown in the FIG. 4, the tilting slot 12 runs, in relation to the main pivot axis 6, along a radius radially inside the active slot 11. In an alternative embodiment (not shown), however, the reverse may apply; that is to say, the active slot 11 runs, in relation to the main pivot axis 6, radially inside the tilting slot 12.

The gearshift unit 8 is further provided with operating elements 26, 27 for axial displacement of the pivot pin 10 along the axis of symmetry 19 of the sleeve 18. In this instance, the operating elements 26, 27 comprise a first element 26 for introducing the pivot pin into the active slot 11 so that the gearshift lever 5 can be moved between active gearshift positions. A second element 27 is provided for introducing the pivot pin 10 into the tilting slot 12 thereby allowing the gearshift lever 5 to be tilted.

The first element 26 comprises a ramp 28 sloping at an inclined angle towards the axis of symmetry 19 of the gearshift lever 5, the ramp being rigidly connected to pivot pin 10. The first element 26 furthermore has a button element 29 interacting with the ramp 28. The button element 29 is arranged so that it is displaceable essentially at right angles to the axis of symmetry 19 of the sleeve 18, the ramp 28 and hence the pivot pin 10 being displaced along the axis of symmetry 19 of the gearshift lever 5 when the button element 29 is pressed against the ramp 28. The second element 27 consists of a pushbutton, which acts on the upper end of the rod 17. It can furthermore be seen from FIGS. 1 and 2 that the gearshift lever 5 is externally provided with an ergonomically shaped knob casing 30 which encloses the rod 17. The knob casing is not shown in FIGS. 3, 4 and 5.

The gearshift unit 8, as can be seen from FIG. 5, comprises a control unit 31, which has a sensor 32 intended to detect whether or not the pivot pin is situated in the tilting slot. The control unit 31 further comprises separate detection elements 33 for detecting each gearshift position. The control unit 31 thereby prevents position signals being emitted when the pivot pin 10 is situated in the tilting slot 12. All position signals consequently cease as soon as tilting of the gearshift lever 5 commences so that the risk of accidental detection of an active position when the gearshift lever 5 is tilted can be eliminated.

The gearshift unit 1 is further designed so that it is possible at all times to move the gearshift lever 5 to the neutral position without the driver having to press any button irrespective of in which position the gearshift lever 5 happens to be situated. This characteristic is important for safety reasons since the driver must be able to rapidly and intuitively bring the gearshift lever 5 into the neutral position in a critical situation. Furthermore, the spring-loading in the neutral position makes it impossible to bring the gearshift lever 5 out of the neutral position without manipulation of the operating elements 26 and 27. This locking mechanism reduces the risk of accidental engagement of a gear. The design of the locking unit in the neutral position slot means that the neutral position can be rapidly reached without operating and releasing mechanical catches, that the neutral position can be rapidly found since, when rotated, the gearshift lever is not allowed to pass the neutral position slot and is then retained in the neutral position slot, and that, without pressing a button, the gearshift lever 5 is locked between neutral position and the [lacuna], and not simply locked between neutral position and reverse gear as is the case with previously known solutions. This prevents the possibility of accidentally engaging the drive position.

According to the invention, a logic unit 34 situated in the vehicle is furthermore designed to activate the vehicle parking brake (not shown), provided that both of the following conditions are fulfilled: (a) that the logic unit 34 receives a first signal from a sensor situated in the gearshift unit 1, the first signal indicating that the gearshift lever 5 is in its tilted position, and (b) that the logic unit 34 receives a second signal from a sensor 36 situated in the vehicle, the second signal indicating that the vehicle is stationary.

In the example shown, the logic unit 34 is connected to the sensors 35 and 36 by means of lines 37 and 38, respectively. If both of the aforementioned conditions are fulfilled, the logic unit 34 emits a signal via an output signal line 39, which activates the parking brake. The brake systems used on trucks are almost exclusively pneumatic or partially pneumatic brake systems, so that the output signal leads to the activation of an electronically controlled valve (not shown) and thereby applying pneumatic pressure to the brakes (not shown). The parking brake function according to the invention can either be used alone as primary parking brake activation, or in combination with a conventional parking brake control. The sensor 36 for detecting whether the vehicle is stationary may consist, for example, of known sensors for measuring the speed of the vehicle; the logic unit, instead of communicating directly with a sensor, communicating with a control unit forming part of the vehicle.

The invention is not limited to exemplary embodiments described above and illustrated in the drawings, but can be readily modified without departing from the scope of the patented claims. For example, the two operating elements 26, 27 may be integrally formed in one and the same element, such as a two-way toggle switch.

What is claimed is:

1. A vehicle comprising:
   a gearshift unit having a gearshift lever housing and a gearshift lever moveable in relation to the gearshift lever housing, the gearshift lever being maneuverable within an active position range for active gearshift positions and a neutral position in which the gearshift lever is tiltable, between the active position range and a tilted position, in which latter position the gearshift lever is aligned in or below the seat plane of the driver's seat; and
   a logic unit configured to control activation of a parking brake forming part of the vehicle and to activate the vehicle parking brake, provided that both of the following conditions are fulfilled: (a) the logic unit receives a first signal indicating that the gearshift lever is in its tilted position and (b) the logic unit receives a second signal indicating that the vehicle is stationary.

2. The vehicle as recited in claim 1, wherein the gearshift lever is rotatable about a main pivot axis for accessing the active position range and the tilted position.

3. The vehicle as recited in claim 1, wherein the gearshift unit is firmly fixed to a sprung part of the driver's seat.

4. The vehicle as recited in claim 2, wherein the gearshift lever is constructed from a rod, which is provided with a pivot pin arranged at a distance from the main pivot axis, the pivot pin being designed, through manipulation of the rod, to run either in a first, active slot for active positions, or in a second, tilting slot for assuming a tilted position.

5. The vehicle as recited in claim 4, wherein the active slot is connected to the tilting slot solely by way of an intermediate neutral position slot, the position of which corresponds to the neutral position of the gearshift lever.

6. The vehicle as recited in claim 5, wherein the pivot pin, through spring-loading, is designed to be retained in the neutral position slot when the neutral position has been assumed either from the active slot or from the tilting slot.

7. The vehicle as recited in claim 6, wherein the spring-loading is provided by two spring elements acting in opposition to one another.

8. The vehicle as recited in claim 4, wherein the pivot pin is axially displaceable along an axis of symmetry of the gearshift lever.

9. The vehicle as recited in claim 4, wherein the pivot pin, at least in one direction, projects essentially at right angles to the axis of symmetry of the gearshift lever.

10. The vehicle as recited in claim 4, wherein the active slot and the tilting slot run essentially along a radius around the main pivot point of the gearshift lever.

11. The vehicle as recited in claim 8, wherein the gearshift lever is provided with operating elements for axial displacement of the pivot pin along the axis of symmetry of the rod.

12. The vehicle as recited in claim 11, wherein the operating element comprises a first element for introducing the pivot pin into the active slot, so that the gearshift lever can be moved between the active gearshift positions, and a second element for introducing the pivot pin into the tilting slot, thereby allowing the gearshift lever to be tilted.

13. The vehicle as recited in claim 12, wherein the first element comprises a ramp sloping at an inclined angle towards [lacuna] the axis of symmetry, the ramp being rigidly connected to the pivot pin, and a button element, interacting with the ramp and arranged so that it is displaceable essentially at right angles to the axis of symmetry, the ramp and hence the pivot pin being displaced along the axis of symmetry of the gearshift lever when a driver presses the button element against the ramp.

14. The vehicle as recited in claim 12, further comprising:

a sensor is designed to detect radial positions of the pivot pin, and to prevent position signals being emitted when the pivot pin is in the tilting slot.

15. The vehicle as recited in claim 12, further comprising:

a logic unit situated in the vehicle activates a vehicle parking brake forming part of the vehicle, provided that both of the following conditions are fulfilled: (a) that the logic unit receives a first signal indicating that the gearshift lever is in its tilted position; and (b) the logic unit receives a second signal indicating that the vehicle is stationary.

* * * * *